United States Patent
Papathanassiou et al.

(10) Patent No.: US 9,635,664 B2
(45) Date of Patent: Apr. 25, 2017

(54) SOUNDING REFERENCE SIGNAL ENHANCEMENT TO SUPPORT UPLINK COORDINATED MULTIPOINT

(75) Inventors: Apostolos Papathanassiou, San Jose, CA (US); Shahrnaz Azizi, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 13/595,640

(22) Filed: Aug. 27, 2012

(65) Prior Publication Data

US 2013/0195028 A1 Aug. 1, 2013

Related U.S. Application Data

(60) Provisional application No. 61/591,641, filed on Jan. 27, 2012.

(51) Int. Cl.
*H04W 4/00* (2009.01)
*H04W 72/04* (2009.01)
(Continued)

(52) U.S. Cl.
CPC ............ *H04W 72/044* (2013.01); *H04B 1/69* (2013.01); *H04B 7/024* (2013.01); *H04B 7/0413* (2013.01); *H04B 7/0456* (2013.01); *H04B 7/0617* (2013.01); *H04B 7/0639* (2013.01); *H04L 1/0026* (2013.01); *H04L 1/1864* (2013.01);
(Continued)

(58) Field of Classification Search
CPC ..... H04B 7/024; H04L 25/0224; H04L 5/003; H04W 72/02; H04W 74/0866; H04W 4/02; H04W 72/0413; H04W 74/004; H04W 74/0833; H04W 64/00; H04W 16/32; H04W 24/02; H04W 4/025;
(Continued)

(56) References Cited

U.S. PATENT DOCUMENTS

2009/0305693 A1* 12/2009 Shimomura ........ H04W 74/004
455/422.1
2010/0034155 A1* 2/2010 Noh .................... H04W 74/004
370/329
(Continued)

FOREIGN PATENT DOCUMENTS

CN 104145524 A 11/2014
KR 1020080015349 A 2/2008
(Continued)

OTHER PUBLICATIONS

"Discussion on UL RS Enhancements for Rel-11", 3GPP TSG RAN WG1 Meeting #66. R1-112480. LG Electronics., (Aug. 22, 2011), 4 pgs.
(Continued)

*Primary Examiner* — Chi H Pham
*Assistant Examiner* — Lionel Preval
(74) *Attorney, Agent, or Firm* — Schwegman Lundberg & Woessner, P.A.

(57) ABSTRACT

Systems and techniques for sounding reference signal enhancement to support uplink coordinated multipoint are described herein. A sounding reference signal may be assigned to a user equipment based on a relationship between the user equipment and a cell edge of a cell served by a wireless network device and serving the user equipment.

20 Claims, 3 Drawing Sheets

(51) Int. Cl.
| | |
|---|---|
| H04L 27/26 | (2006.01) |
| H04B 1/69 | (2011.01) |
| H04W 72/08 | (2009.01) |
| H04B 7/024 | (2017.01) |
| H04B 7/0413 | (2017.01) |
| H04B 7/0456 | (2017.01) |
| H04B 7/06 | (2006.01) |
| H04W 4/08 | (2009.01) |
| H04L 12/18 | (2006.01) |
| H04L 29/06 | (2006.01) |
| H04L 1/18 | (2006.01) |
| H04L 5/14 | (2006.01) |
| H04W 52/02 | (2009.01) |
| H04W 36/00 | (2009.01) |
| H04L 1/00 | (2006.01) |
| H04W 76/04 | (2009.01) |
| H04L 5/00 | (2006.01) |
| H04W 36/04 | (2009.01) |

(52) U.S. Cl.
CPC .......... *H04L 1/1896* (2013.01); *H04L 5/0035* (2013.01); *H04L 5/0048* (2013.01); *H04L 5/1469* (2013.01); *H04L 12/189* (2013.01); *H04L 27/2607* (2013.01); *H04L 65/4076* (2013.01); *H04L 65/608* (2013.01); *H04W 4/005* (2013.01); *H04W 4/08* (2013.01); *H04W 36/0094* (2013.01); *H04W 52/0216* (2013.01); *H04W 72/04* (2013.01); *H04W 72/042* (2013.01); *H04W 72/0406* (2013.01); *H04W 72/0493* (2013.01); *H04W 72/082* (2013.01); *H04W 72/085* (2013.01); *H04W 76/048* (2013.01); *H04L 1/0027* (2013.01); *H04L 1/0031* (2013.01); *H04L 1/1887* (2013.01); *H04L 5/0053* (2013.01); *H04W 36/04* (2013.01); *Y02B 60/50* (2013.01)

(58) Field of Classification Search
CPC ............. H04W 52/325; H04W 56/006; H04W 72/085; H04J 13/0062; H04J 13/0059; H04J 11/0053
USPC ....... 370/329; 455/506, 452.1, 422.1, 456.1; 375/260
See application file for complete search history.

(56) References Cited

U.S. PATENT DOCUMENTS

| | | | | |
|---|---|---|---|---|
| 2011/0098054 | A1* | 4/2011 | Gorokhov et al. | 455/452.1 |
| 2011/0103499 | A1* | 5/2011 | Cheng | H04W 56/0005 375/260 |
| 2011/0275397 | A1* | 11/2011 | Guey et al. | 455/509 |
| 2012/0057535 | A1* | 3/2012 | Zhang et al. | 370/329 |
| 2013/0217413 | A1* | 8/2013 | Sanders | G01S 3/30 455/456.1 |

FOREIGN PATENT DOCUMENTS

| | | |
|---|---|---|
| KR | 1020080112115 A | 12/2008 |
| KR | 1020100077401 A | 7/2010 |
| WO | WO-2013112866 A1 | 8/2013 |

OTHER PUBLICATIONS

"International Application Serial No. PCT/US2013/023187, International Search Report mailed Jun. 2, 2013", 4 pgs.
"International Application Serial No. PCT/US2013/023187, Written Opinion mailed Jun. 2, 2013", 5 pgs.
"Chinese Application Serial No. 201380009647.4, Preliminary Amendment filed Mar. 4, 2015", 8 pgs.
"European Application Serial No. 13741100.5, Extended European Search Report mailed Jul. 27, 2015", 9 pgs.
"European Application Serial No. 13741100.5, Office Action mailed Sep. 4, 2014", 7 pgs.
"European Application Serial No. 13741100.5, Response filed Mar. 5, 2015 to Office Action mailed Sep. 4, 2014", 7 pgs.
"International Application Serial No. PCT/US2013/023187, International Preliminary Report on Patentability mailed Aug. 7, 2014", 7 pgs.
Alcatel-Lucent, et al., "Design details for enhanced PDCCH", 3GPP Draft; R1-113322 Design Details for Enhanced PDCCH, 3rd Generation Partnership Project (3GPP), Mobile Competence Centre; 650, Route Des Lucioles ; F-06921 Sophia-Antipolis Cedex ; France, vol. RAN WG1, no. Zhuhai, (Oct. 6, 2011).
Ericsson, et al., "Potential Enhancements for SRS", 3GPP Draft; R1-114255, 3rd Generation Partnership Project (3GPP), Mobile Competence Centre; 650, Route Des Lucioles ; F-06921 Sophia-Anti Poli S Cedex ; France, vol. RAN WG1 no. San Francisco, USA;, (Nov. 8, 2011).
Ericsson, et al., "Potential Enhancements for UL DMRS", 3GPP Draft; R1-114253, 3rd Generation Partnership Project (3GPP), Mobile Competence Centre ; 650, Route Des Lucioles ; F-06921 Sophia-Antipoli S Cedex ; France, vol. RAN WG1, no. San Francisco, USA, (Nov. 8, 2011).
Potevio, "Discussion on UL-RS enhancements", 3GPP Draft; R1-112581 Discussion on UL-RS Enhancements, 3rd Generation Partnership Project (3GPP), Mobile Competence Centre 650, Route Des Lucioles ; F-06921 Sophia-Antipolis Cedex ; France, vol. RAN WG1, no. Athens, Greece;, (Aug. 16, 2011).
Sharp, "UL RS Enhancements to Support Efficient UL CoMP", 3GPP Draft; R1-113824 UL RS Enhancement, 3rd Generation Partnership Project (3GPP), Mobile Competence Centre ; 650, Route Des Lucioles ; F-06921 Sophia-Anti Polis Cedex ; France, vol. RAN WG1, no. San Francisco, USA;, (Nov. 8, 2011).
"European Application Serial No. 13741100.5, Response filed Feb. 23, 2016 to Extended European Search Report mailed Jul. 27, 2015", 14 pgs.

* cited by examiner

SOUNDING REFERENCE SIGNAL ENHANCEMENT TO SUPPORT UPLINK COORDINATED MULTIPOINT

CLAIM OF PRIORITY

This patent application claims the benefit of priority, under 35 U.S.C. §119(e), to U.S. Provisional Patent Applicant Ser. No. 61/591,641, titled "ADVANCED WIRELESS COMMUNICATION SYSTEMS AND TECHNIQUES," filed Jan. 27, 2012, which is hereby incorporated by reference in its entirety.

BACKGROUND

Wireless network technologies may sometimes use signals to help determine radio link characteristics between two devices. In an example, a cellular radio network may assign a signal, such as a sounding reference signal (SRS), to a user equipment (UE) to use in link estimations.

In an example, a network according to a 3rd Generation Partnership Project (3GPP) family of standards (e.g., 3GPP Long Term Evolution release 10, 3GPP standard 36.21X vb.x.x, release 11 and beyond), may use a number of orthogonal base sequences as SRSs. In an example, the network may use Zadoff-Chu base sequences because they provide a constant amplitude electromagnetic signal in radio communications and are also orthogonal when cyclically shifted. A cyclic shift is generally a set number of translations of the underlying base sequences. For example, given a sequence {a, b, c, d} a cyclic shift of two would yield the sequence {c, d, a, b}. These qualities provide for robust link quality estimations and allow different sequences to be assigned to different UEs in order to distinguish between the UEs. In 3GPP Long Term Evolution (LTE) compliant networks, cyclic extensions of Zadoff-Chu base sequences may be used to align the base sequence to the physical link characteristics, such as SRS resource block (RB) allocations. Such cyclic extension reduces the orthogonality property of the sequences. In this case, the orthogonality of the sequences may be said to be quasi-orthogonal. However, as used herein, the definition of orthogonal sequences includes quasi-orthogonal sequences (i.e., the terms may be used interchangeably).

In an example, some wireless networks may use coordinated multipoint (CoMP) reception to enhance performance. CoMP may involve the use of two or more wireless network devices to receive a wireless signal and coordinate the received signals to increase data integrity. To improve the effectiveness of CoMP some wireless networks may increase signaling from a transmitter (e.g., a UE) in order to facilitate coordination of received signals. In an example, such as the Long Term Evolution (LTE) release 10 3GPP standard, the increased signaling may be accomplished via more frequent sounding, for example, in either a periodic or an aperiodic fashion.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In a CoMP scenario, a UE may provide sounding to both wireless network device receivers. For non-primary wireless network receivers, reception of the UE's sounding may be interfered by UEs in its own cell as well as UEs in cells served by the non-primary wireless network receivers. As noted above, the interference may be reduced by increasing the frequency with which the UEs are given opportunities to transmit their sounding signal sequences. However, such increased signaling results in additional overhead and thus reduces the efficiency with which network resources are used.

An alternative solution to increasing the frequency of sounding by UEs is extending the number of cyclic shifts of signal sequences to multiplex additional UEs. That is, by expanding the pool of signal sequences, the receiving wireless network devices may more easily distinguish between UEs and achieve more reliable link quality estimations. Using additional cyclic shifts of the underlying base sequences may achieve the goal of improved link estimation without additional network resource overhead. However, under certain radio conditions, increasing the number of cyclic shifts may lead to reduced orthogonality in SRSs derived from given base sequences. This reduced orthogonality may increase interference between UEs.

To solve the problems discussed above, selective use of cyclically shifted base sequences may be used. In an example, a different cyclic shift may be assigned to a UE based on the UE's logical position within a cell and with respect to the edge of the cell. For example, a UE in a cell-edge position may be assigned a signal sequence that is a greater cyclic shift of a UE that is not in a cell-edge position. In an example, cell-edge UEs may be multiplexed on the same radio resources using the additional signal sequences generated by the greater cyclic shift of the base sequences. In an example, multiplexed UEs may be assigned these additional signal sequences to increase, or even maximize, orthogonality. Thus, the increased quality of link estimation may be achieved at the cell edge without the possible reduction of link estimation for non-cell-edge UEs.

Figure 1:
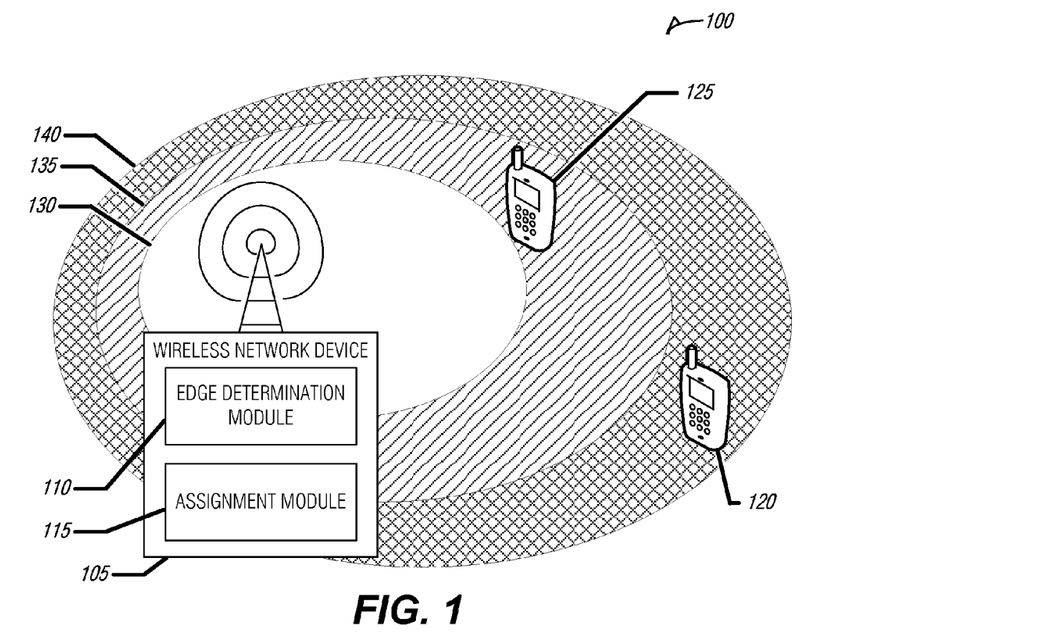
FIG. 1 illustrates an example of a system for sounding reference signal selection for a UE, according to an embodiment.

FIG. 1 illustrates an example of a system 100 for sounding reference signal selection for a UE, according to an embodiment. System 100 may include a wireless network device 105, and two UEs 120 and 125. The wireless network device 105 may include an edge determination module 110 and an assignment module 115. In an example, the wireless network device comprises an eNodeB according to a 3GPP family of standards. FIG. 1 also illustrates regions 130, 135, and 140 of a cell served by the wireless network device 105.

The edge determination module 110 may be arranged to determine a logical position of the UE 120 with a cell served by the wireless network device 105. The logical position may be determined with respect to an edge of the cell. The position is considered "logical" because the absolute position of the UE 120 may change with respect to the wireless network device 105, or other landmark, over time while the logical position of the UE 120 may remain the same. In an example, the edge determination module 110 may be arranged to determine the logical position of the UE 120 with respect to the cell edge using the measured signal strength received power (SSRP) of the UE 120 at the wireless network device 105. In an example, the edge determination module 110 may be arranged to assign the logical position of "cell-edge" to the UE 120 when the SSRP is below a predetermined threshold.

In an example, the logical position may be selected from a group representing a plurality of nested regions (e.g., regions 130, 135, and 140) within the cell. In an example, boundaries between the plurality of nested regions may be defined by SSRP thresholds. In an example, boundaries between the plurality of nested regions may be defined by geographic landmarks. Such landmarks may include municipal boundaries, areas defined by latitude or longitude, buildings, etc. In an example, boundaries between the plurality of nested regions may be defined by physical distance from the wireless network device 105.

In an example, each of the plurality of nested regions may be assigned a signal sequence class from a set of signal sequence classes. In an example, the set of signal sequence classes consists of two signal sequences classes, with one of the two signal sequence classes being a cell-edge class. In an example, the logical position is correlated to a signal sequence class. For example, the cell-edge logical position may be correlated to the cell-edge class.

The assignment module 115 may be arranged to assign a signal sequence from a signal sequence class to the UE 120 based on the logical position of the UE 120. In an example, the signal sequence class is one of a member of the set of signal sequence classes.

In an example, the signal sequences in the members of the set of signal sequences may be sounding reference signal (SRS) sequences. The SRS sequences may be arranged to be used by the UE 120 in an SRS transmission. An SRS transmission, for example as used in a 3GPP family of standards, may facilitate channel quality estimation (e.g., channel impulse response estimation) by a receiving device (e.g., the wireless network device 105). In an example, signal sequences in the members of the set of signal sequence classes may be cyclic shifts of one or more base sequences. The cyclic shifts may be a subset of the total possible number of cyclic shifts of a base sequence. In an example, the base sequences are Zadoff-Chu sequences. In an example, where the UE's logical position is cell-edge, the signal sequence class is a cell-edge class. In an example, the number of cyclic shifts of a given base sequence in the cell-edge class is greater than the number of cyclic shifts of the given base sequence in a non-cell-edge class. For example, if region 140 corresponds to the cell-edge logical position of the UE 120, it may be assigned the cell-edge class. Regions 130 and 135 may then be assigned the same or different non-cell-edge classes. Thus, the signal sequences assigned to the UE 120 will have a greater number of cyclic shifts of a base sequence than signal sequences assigned to the UE 125 given the same base sequence. In an example, the number of cyclic shifts of the base sequence in the cell-edge class is a positive integer multiple of the number of cyclic shifts of the base sequence in a non-cell edge class. In an example, the positive integer multiple is two. For example, if the cyclic shifts associated with the cell class of region 130 are eight, the cyclic shifts classes associated with regions 135 and 140 may respectively be sixteen and thirty two. In an example, when the set of signal sequences classes consists of two classes, the non-cell-edge class may have a cyclic shift number of eight and the cell-edge class may have a cyclic shift number of sixteen.

In an example, the assignment module 115 may be arranged to assign a first signal sequence from a signal sequence class to the UE 120. The assignment module 115 may also be arranged to assign a second signal sequence from the same signal class to a second UE (not shown) in the same logical position as the UE 120. In this example, the first signal sequence and the second signal sequence are different members of the same signal sequence class. In an example, the first and second signal sequences are selected to improve, or maximize, orthogonality between them.

In an example, the assignment module 115 may be arranged to assign a first signal sequence from a first signal sequence class to the UE 120. The assignment module 115 may also be arranged to assign a second signal to a second UE 125. In this example, the second signal sequence may be taken from a member of a second signal sequence class that is different than the first signal sequence class. In this example, the UE 125 is in a different logical position than the UE 120. Further, the first signal sequence class correlates to the logical position of the UE 120 and the second signal sequence class correlates to the logical position of the UE 125.

Figure 2:
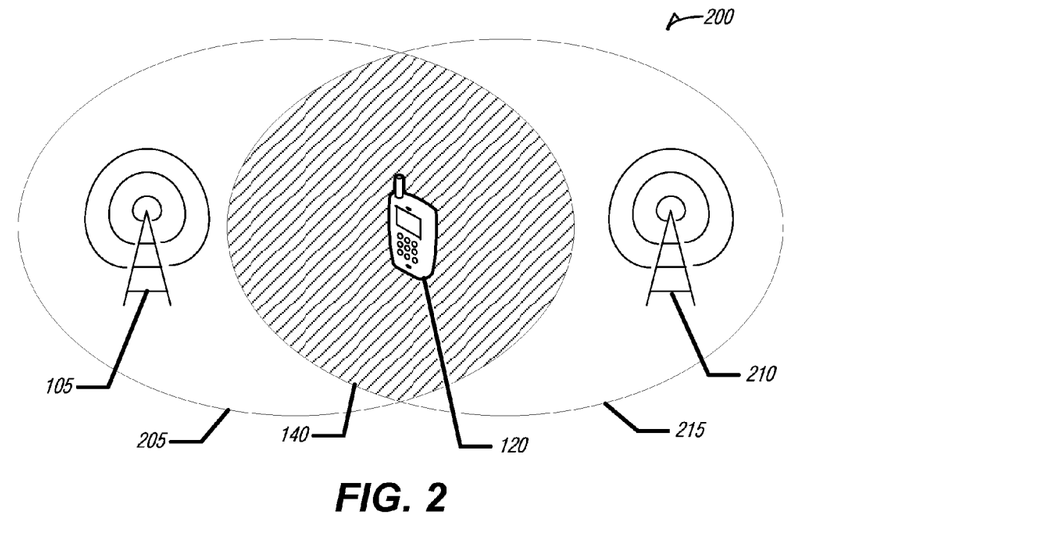
FIG. 2 illustrates an example of a coordinated multipoint system, according to an embodiment.

FIG. 2 illustrates an example of a coordinated multipoint system 200, according to an embodiment. System 200 may include a first wireless network device 105 and a second wireless network device 210. Each of these wireless network devices may respectively serve cells 205 and 215. System 200 may also include a UE 120 in a cell-edge region 140. In an example, the first wireless network device 105 is arranged to coordinate with the second wireless network device 210 to perform joint reception of signals for the UE 120. In an example, both the first wireless network device 105 and the second wireless network device 210 are arranged to perform joint reception of the UE's signals according to CoMP as specified by the 3GPP family of standards.

As illustrated, cell-edge region 140 is shared between cells 205 and 215 permitting CoMP reception of the UE's signals by the wireless network devices 105 and 210. In an example, the cell-edge region 140 only exists, and is defined, by when CoMP is available within the cell-edge region 140. That is, even if the region 140 meets the previously described boundary threshold for the cell-edge classification of the region 140, the absence of the second wireless network device 210 (e.g., the absence of CoMP operations) would prevent the region 140 from being a cell-edge region.

Figure 3:
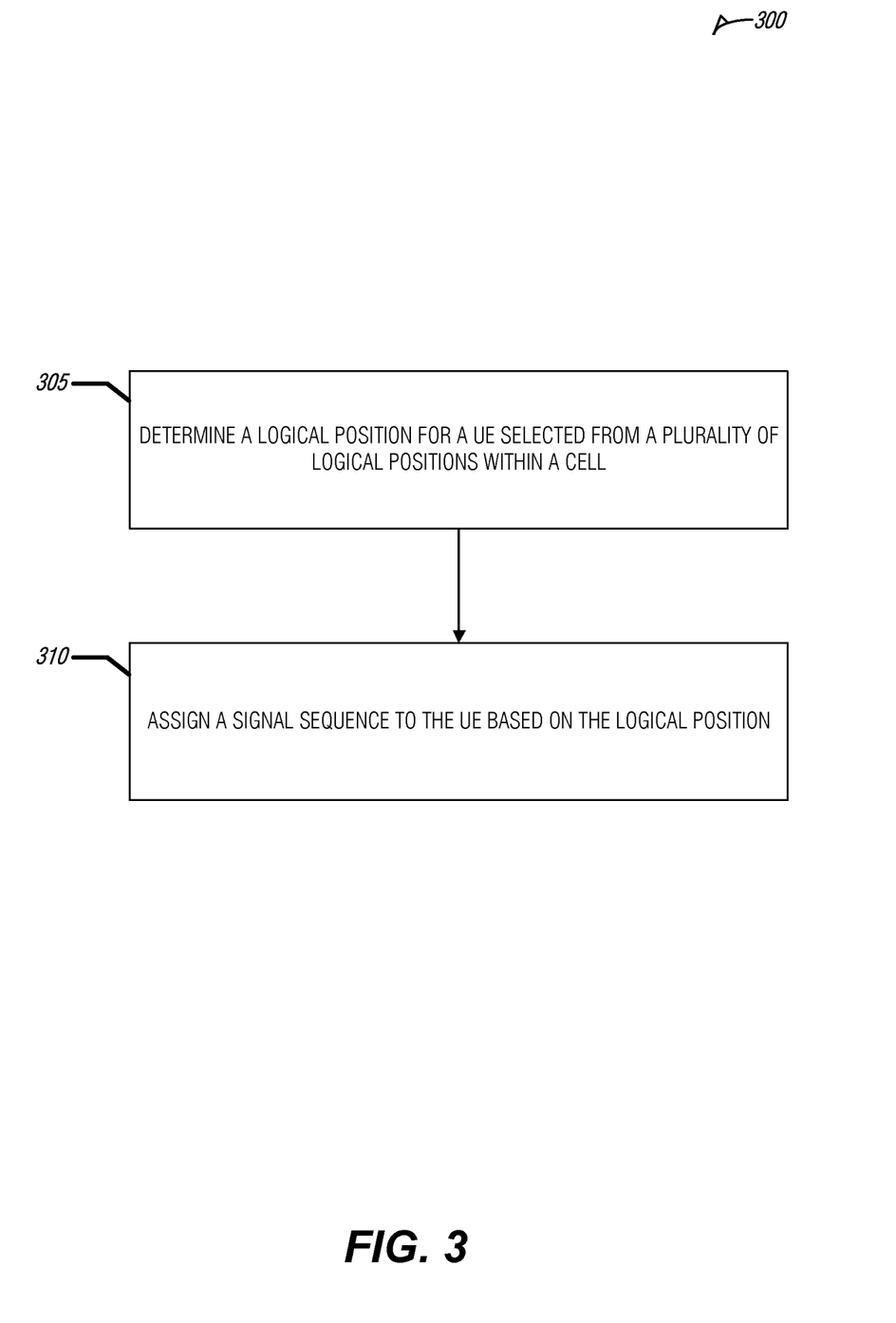
FIG. 3 illustrates an example of a method for sounding reference signal selection for a UE, according to an embodiment.

FIG. 3 illustrates an example of a method 300 for sounding reference signal selection for a UE, according to an embodiment. Operations described below are performed on hardware. In an example, previously described components, such as the wireless network device 105, may perform one or more of the following operations.

At operation 305, a logical position for a UE may be determined. The logical position may be selected from a plurality of logical positions within a cell served by the wireless network device 105. In an example, logical positions in the plurality of logical positions may be nested regions of the cell as illustrated with regions 130, 135, and 140 in FIG. 1. In an example, boundaries of the nested regions defined by thresholds of measured SSRP of the UE 120 at the wireless network device 105. In an example, the boundaries of the nest regions may be defined by geographic features. For example, a geographic feature may include the border of a city, a river, a specific latitude, etc. In an example, the boundaries of the nested regions may be defined by a physical distance of the UE 120 from the wireless network device 105. In an example, the nested regions may include a cell-edge region 140.

At operation 310, a signal sequence may be assigned to the UE based on the logical position determined at operation 305. In an example, the assignment may be performed by the wireless network device 105. In an example, the signal sequence may be a member of a set of signal sequences arranged to provide channel quality estimation by the wireless network device 105 when used by the UE 120. In an example, members of the set of signal sequences may be arranged to uniquely identify the UE 120 from other UEs (e.g., UE 125) in the cell.

In an example, the signal sequence may be an SRS. In an example, the SRS may be selected from a group of SRSs unique to the cell-edge region 140. In an example, the group of SRSs unique to the cell-edge region 140 may be cyclic shifts of respective SRSs unique to a different nested region, such as regions 130 or 135. In an example, the cyclic shifts of the group of SRSs unique to the cell-edge region 140 may be a subset of the number of cyclic shifts of a respective base sequence. The number of cyclic shifts may be a multiple of a second number of cyclic shifts of the respective base sequence. In an example, the second number of cyclic shifts of respective base sequences may define a group of SRSs unique to a different nested region. In an example, a single different nested region may exist in the nested regions. The single different nested region may be the innermost region, such as region 130.

Figure 4:
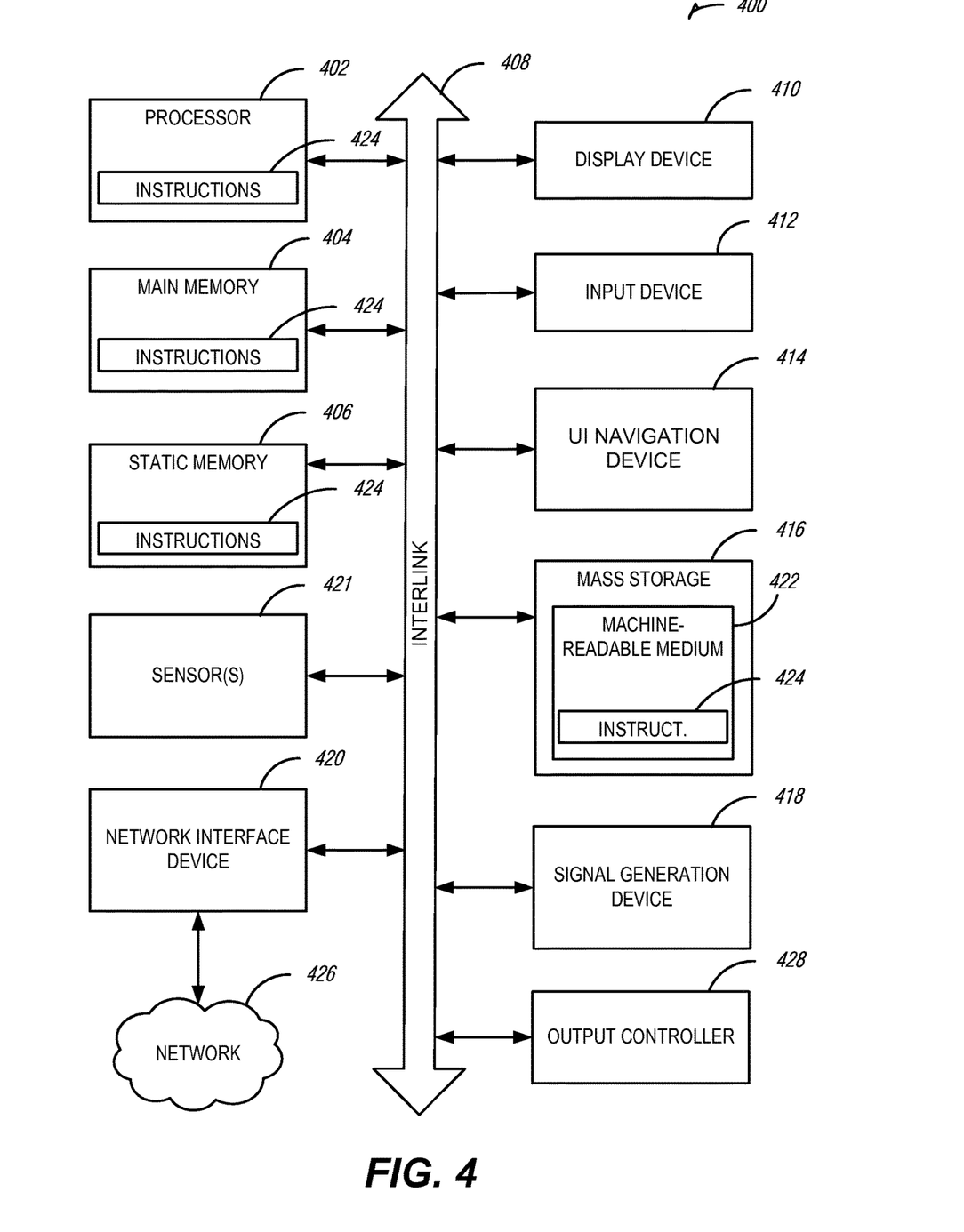
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in a peer-to-peer (P2P) (or other distributed) network environment. The machine 400 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 411 (e.g., a mouse). In an example, the display unit 410, input device 417 and UI navigation device 914 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR)) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) that arranged to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples

Example 1 includes subject matter (such as a device, apparatus, or wireless network device) comprising an edge determination module—the edge determination module arranged to determine a logical position of a user equipment (UE) within a cell served by the wireless network device and with respect to an edge of the cell—and an assignment module—the assignment module arranged to assign a signal sequence from a signal sequence class to the UE based on the logical position of the UE, the signal sequence class being a member of a set of signal sequence classes.

In Example 2, the subject matter of Example 1 may optionally include the signal sequences in the members of the set of signal sequence classes being cyclic shifts of one or more base sequences via a subset of a number of cyclic shifts of a base sequence.

In Example 3, the subject matter of Example 2 may optionally include the one or more base sequences being Zadoff-Chu based sequences.

In Example 4, the subject matter of any one or both of Examples 2 and 3 may optionally include the logical position being cell-edge, and the signal sequence class being a cell-edge class, where the number cyclic shifts of the base sequence in the cell-edge class is greater than the number cyclic shifts of the base sequence in a non-cell-edge class.

In Example 5, the subject matter of Example 4 may optionally include the set of signal sequence classes consisting of two signal sequences classes, and the number cyclic shifts of the base sequence in the cell-edge class being a positive integer multiple of the number cyclic shifts of the base sequence in a non-cell-edge class.

In Example 6, the subject matter of Example 5 may optionally include the positive integer multiple being two.

In Example 7, the subject matter of Example 6 may optionally include the number cyclic shifts of the base sequence in a non-cell-edge class being eight.

In Example 8, the subject matter of any one or more of Examples 2-7 may optionally include the signal sequences being sounding reference signal (SRS) sequences arranged to be used by the UE in an SRS transmission, where the SRS transmission facilitates channel quality estimation by a receiving device.

In Example 9, the subject matter of any one or more of Examples 1-8 may optionally include the wireless network device comprising an eNodeB according to a 3rd generation partnership project (3GPP) family of standards.

In Example 10 the subject matter of any one or more of Examples 1-9 may optionally include the edge determination module being arranged to determine the logical position of the UE with respect to the edge of the cell served by the wireless network device using measured signal strength received power (SSRP) of the UE at the wireless network device.

In Example 11, the subject matter of Example 10 may optionally include the edge determination module being arranged to assign the logical position of cell-edge to the UE when the SSRP is below a predetermined threshold.

In Example 12, the subject matter of any one or more of Examples 1-11 may optionally include the assignment module being arranged to assign a first signal sequence from the signal sequence class to the UE, and assign a second signal sequence from the signal sequence class to a second UE. The first and second signal sequences being orthogonal to each other, and the second UE being in the same logical position as the UE.

In Example 13, the subject matter of any one or more of Examples 1-12 may optionally include the assignment module being arranged to assign a first signal sequence from the signal sequence class to the UE, and assign a second signal sequence from a different member of the set of signal sequence classes to a second UE, wherein the second UE is in a different logical position than the UE.

In Example 14, the subject matter of any one or more of Examples 1-13 may optionally include the wireless network device is arranged to coordinate with a second wireless network device to perform joint reception of signals for the UE.

In Example 15, the subject matter of Example 14 may optionally include the wireless network device and the second wireless network device being arranged to perform joint reception of signals for the UE according to a 3GPP family of standards coordinated multi-point (CoMP) procedure.

Example 16 may include, or may optionally be combined with the subject matter of any one or more of Examples 1-15 to include, subject matter (such as a method, means for performing acts, or machine readable medium including instructions that, when performed by a machine cause the machine to perform acts) comprising to determine a logical position for a user equipment (UE)—the logical position selected from a plurality of logical positions within a cell served by a wireless network device—and to assign a signal sequence to the UE based on the logical position.

In Example 17, the subject matter of Example 16 may optionally include logical positions in the plurality of logical positions being nested regions of the cell.

In Example 18, the subject matter of Example 17 may optionally include boundaries of the nested regions being defined by thresholds of measured signal strength received power (SSRP) of the UE.

In Example 19, the subject matter of any one or both of claims 17 and 18 may optionally include boundaries of the nested regions being defined via geographic features.

In Example 20, the subject matter of any one or more of claims 17-19 may optionally include boundaries of the nested regions being defined via a physical distance from the wireless network device.

In Example 21, the subject matter of any one or more of claims 16-20 may optionally include the signal sequence being a member of a set of signal sequences arranged to provide channel quality estimation by the wireless network device when used by the UE.

In Example 22, the subject matter of Example 21 may optionally include members of the set of signal sequences being arranged to uniquely identify the UE from other UEs in the cell.

In Example 23, the subject matter of any one or both of Examples 21 and 22 may optionally include logical positions in the plurality of logical positions being nested regions of the cell, members of the set of signal sequences being cyclic shifts of a base sequence—a cyclic shift being a subset of the number of cyclic shifts of the base sequence—and a member of the set of signal sequences being uniquely associated with a region in the nested regions. A number of cyclic shifts for the member being a multiple of the number of cyclic shifts for a second member uniquely associate with the innermost region in the nested regions.

In Example 24, the subject matter of Example 23 may optionally include, to assign the signal sequence to the UE based on the logical position, to assign one of a plurality of signal sequences uniquely associated with a region in the nested regions, the region corresponding to the logical location.

Example 25 may include, or may optionally be combined with the subject matter of any one or more of Examples 1-24 to include, subject matter (such as a method, means for performing acts, or machine readable medium including instructions that, when performed by a machine cause the machine to perform acts) comprising assigning, by a wireless network device using a hardware element, a sounding reference signal (SRS) to a user equipment (UE) based on a relationship between the UE and a cell edge of a cell served by the wireless network device and serving the UE.

In Example 26, the subject matter of Example 25 may optionally include the relationship between the UE and the cell edge being one of a set of nested regions of the cell, the set of nested regions including a cell-edge region.

In Example 27, the subject matter of Example 26 may optionally include the SRS being selected from a group of SRSs unique to the cell-edge region.

In Example 28, the subject matter of Example 27 may optionally include the group of SRSs unique to the cell-edge region being cyclic shifts of respective SRSs unique to a different nested region.

In Example 29, the subject matter of Example 28 may optionally include the cyclic shifts for the group of SRSs unique to the cell-edge region being a subset of the number of cyclic shifts of a respective base sequence, the number of cyclic shifts being a multiple of a second number of cyclic shifts of the respective base sequence unique to the different nested region.

In Example 30, the subject matter of Example 29 may optionally include the different nested region being an innermost region of the nested regions.

The above detailed description includes references to the accompanying drawings, which form a part of the detailed description. The drawings show, by way of illustration, specific embodiments which can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A wireless network device comprising:
   an edge determination module arranged to determine a logical position of a user equipment (UE) within a cell served by the wireless network device and with respect to an edge of the cell by using measured signal strength received power (SSRP) of the UE at the wireless network device, the logical position selected for the UE from a plurality of logical positions that are nested regions within the cell, boundaries between the plurality of nested regions defined by SSRP thresholds; and
   an assignment module arranged to:
      assign a first signal sequence from a signal sequence class to the UE based on the logical position of the UE within the cell, the signal sequence class being a member of a set of signal sequence classes, signal sequences in the members of signal sequence classes being sounding reference signal (SRS) sequences that facilitate channel quality estimation by the wireless network device when the UE performs an SRS transmission using the SRS sequences;
      assign a second signal sequence from a different member of the set of signal sequence classes to a second UE, wherein the second UE is in a different logical position than the UE; and
      assign a third signal sequence from the signal sequence class to a third UE, wherein the first and third signal sequences are orthogonal to each other, and wherein the third UE is in the same logical position as the UE.

2. The wireless network device of claim 1, wherein signal sequences in the members of the set of signal sequence classes are cyclic shifts of one or more base sequences via a subset of a number of cyclic shifts of a base sequence.

3. The wireless network device of claim 2, wherein the one or more base sequences are Zadoff-Chu based sequences.

4. The wireless network device of claim 2, wherein the logical position is cell-edge; and
   wherein the signal sequence class is a cell-edge class, the number cyclic shifts of the base sequence in the cell-edge class is greater than the number cyclic shifts of the base sequence in a non-cell-edge class.

5. The wireless network device of claim 4, wherein the set of signal sequence classes consist of two signal sequences classes; and
   wherein the number cyclic shifts of the base sequence in the cell-edge class is a positive integer multiple of the number cyclic shifts of the base sequence in a non-cell-edge class.

6. The wireless network device of claim 5, wherein the positive integer multiple is two.

7. The wireless network device of claim 6, wherein the number cyclic shifts of the base sequence in a non-cell-edge class is eight.

8. The wireless network device of claim 1, wherein the wireless network device comprises an eNodeB according to a 3rd generation partnership project (3GPP) family of standards.

9. The wireless network device of claim 1, wherein the edge determination module is arranged to assign the logical position of cell-edge to the UE when the SSRP is below a predetermined threshold for a cell edge logical position.

10. The wireless network device of claim 1, wherein the wireless network device is arranged to coordinate with a second wireless network device to perform joint reception of signals for the UE.

11. The wireless network device of claim 10, wherein the wireless network device and the second wireless network device are arranged to perform joint reception of signals for the first UE according to a 3GPP family of standards coordinated multi-point (CoMP) procedure.

12. At least one computer-readable medium that is not a signal, the computer-readable medium comprising instructions that, when executed by a machine, cause the machine to:
   determine a logical position for a user equipment (UE), the logical position selected for the UE from a plurality of logical positions within a cell served by a wireless network device by using measured signal strength received power (SSRP) of the UE at the wireless network device, logical positions in the plurality of logical positions being nested regions of the cell with boundaries between the plurality of nested regions defined by SSRP thresholds;
   assign a signal sequence to the UE based on the logical position, the signal sequence being a member of a set of signal sequences, members of the set of signal sequences being uniquely associated with a region in the nested regions, signal sequences in the members of signal sequence classes being sounding reference signal (SRS) sequences that facilitate channel quality estimation by the wireless network device when the UE performs an SRS transmission using the SRS sequences;
   assign a second signal sequence from a different member of the set of signal sequence classes to a second UE, wherein the second UE is in a different logical position than the UE; and
   assign a third signal sequence from the signal sequence class to a third UE, wherein the first and third signal sequences are orthogonal to each other, and wherein the third UE is in the same logical position as the UE.

13. The computer-readable medium of claim 12, wherein members of the set of signal sequences are arranged to provide channel quality estimation by the wireless network device when used by the UE.

14. The computer-readable medium of claim 13, wherein members of the set of signal sequences are arranged to uniquely identify the UE from other UEs in the cell.

15. The computer-readable medium of claim 13, wherein members of the set of signal sequences are cyclic shifts of a base sequence, a cyclic shift being a subset of the number of cyclic shifts of the base sequence; and
   wherein a number of cyclic shifts for a member of the set of signal sequences is a multiple of the number of cyclic shifts for a second member uniquely associate with the innermost region in the nested regions.

16. The computer-readable medium of claim 15, wherein to assign the signal sequence to the UE based on the logical position includes to assign one of a plurality of signal sequences uniquely associated with a region in the nested regions, the region corresponding to the logical location.

17. A method comprising:
   assigning, by a wireless network device using a hardware element, a sounding reference signal (SRS) to a user equipment (UE) based on a relationship between the UE and a cell edge of a cell served by the wireless network device and serving the UE, the relationship between the UE and the cell edge being one of a set of nested regions within the cell, the one of the set of nested regions determined by using measured signal strength received power (SSRP) of the UE to the wireless network device with boundaries between the set of nested regions defined by SSRP thresholds;

assigning a second SRS to a second UE that is in a different nested region than the UE, the second SRS selected from a group of SRSs unique to the different nested region; and assigning a third SRS from the signal sequence class to a third UE, wherein the first and third SRSs are orthogonal to each other, and wherein the third UE is in the same logical position as the UE.

18. The method of claim 17, wherein the group of SRSs unique to the cell-edge region are cyclic shifts of respective SRSs unique to the different nested region.

19. The method of claim 18, wherein the cyclic shifts for the group of SRSs unique to the cell-edge region are a subset of the number of cyclic shifts of a respective base sequence, the number of cyclic shifts being a multiple of a second number of cyclic shifts of the respective base sequence unique to the different nested region.

20. The method of claim 19, wherein the different nested region is an innermost region of the nested regions.

* * * * *